Patented Jan. 5, 1937

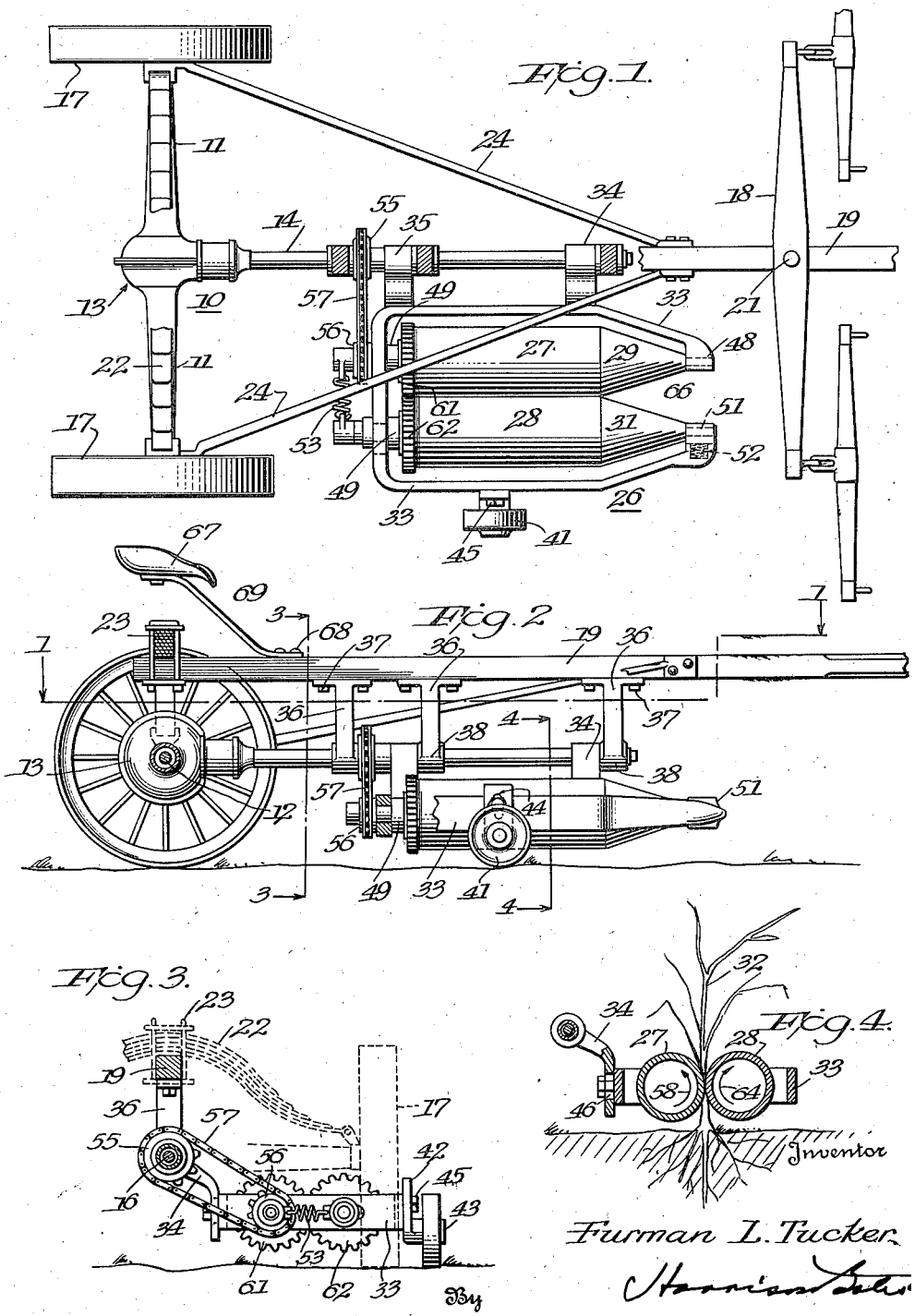

2,066,864

UNITED STATES PATENT OFFICE 2,066,864

FARMING APPARATUS

Furman L. Tucker, Anderson, S. C.

Application February 29, 1936, Serial No. 66,467

4 Claims. (Cl. 55—66)

This invention relates to a farming apparatus and more particularly, but not necessarily, to a machine for ejecting or pulling up cotton stalks after the crop has been gathered.

The roots of a cotton stalk grow downwardly into the ground a considerable distance and the tap root extends down into the clay. In order to clear the field of the old cotton stalks and prepare it for a new crop, it is a general practice to plow these cotton stalks up. This is a laborious operation and very hard on stock as the plowing must be deep enough to uproot the stalk. In fact, this work requires a pair of heavy and expensive horses or mules. Save for the above operation, a farmer could condition his field for a new crop with considerable less preparatory plowing and with smaller and cheaper stock. Aside from the saving in work and the price of the stock, it is much cheaper to keep and maintain small stock in a healthy working condition than large stock.

It is one object of this invention to provide means for eliminating the operation of plowing up cotton stalks from a field containing the same in order to condition such field for a new crop.

Another object is to provide an apparatus for ejecting or pulling up from the ground such stalks.

Another object is to provide a novel apparatus that will quickly and cheaply clear a field of such stalks or elements of like nature.

Another object is to provide an apparatus of the class described that will be simple, efficient, rugged and economical to manufacture.

A further object is to provide an apparatus that will enable a farmer to condition a field containing cotton stalks or the like and grow a new crop on such field at a considerable less cost than has heretofore been known to me.

The above and other objects will be made apparent throughout the further description of the invention when taken in connection with the accompanying drawing wherein like reference characters refer to like parts. It is to be distinctly understood that the drawing is not a definition of the invention, but is merely an illustration showing one form in which the invention may be carried out. Also, it is to be expressly understood that the present apparatus or the novel features thereof may be employed for carrying out operations other than those herein described. The scope of the invention will be defined by the appended claims.

In the drawing:

Figure 1 is a sectional view taken along the line 1—1 of Figure 2.

Figure 2 is a side elevational view of an apparatus embodying the invention.

Figure 3 is a sectional view taken along the line 3—3 of Figure 2, and

Figure 4 is a sectional view taken along the line 4—4 of Figure 2.

Referring to the drawing, 10 indicates in its entirety what is generally known as the rear end of a Ford automobile and comprises the conventional axle housings 11 containing the axles 12, the differential 13, torque tube 14 within which is the propeller shaft 16. Any suitable wheels, such as shown at 17, may be employed.

In the form shown, the present apparatus is adapted to be horse-drawn and to this end there is provided a conventional double tree 18 fixed in the usual manner to a tongue 19, as shown at 21. The rear end of the tongue 19 is rigidly fixed to a member 22 which may be the rear spring of a Ford automobile. The rear spring of a Ford automobile is a convenient member for this purpose and elevates the tongue to a desirable position above the torque tube 14. The tongue 19 is fastened by means of a bracket 23 to substantially the center portion of the spring or member 22.

In the actual operation of the device, the outer end of the tongue will be supported by the horses through the medium of the harness and therefore may be considered fixed, the purpose for which will appear as the invention is disclosed. A pair of torque rods 24 are provided for the conventional purpose of strengthening and holding the tongue 19 rigid. Thus far it can be seen that when a team of horses is hitched to the double tree 18, the rear end 10 of the apparatus may be drawn along, causing the wheels 17 to turn which in turn will cause the propeller shaft 16 to also turn in the same manner and same direction as if the propeller shaft was propelled by a gasoline motor.

For the purpose of ejecting cotton stalks, the latter being in rows, there is provided a novel means represented in its entirety by 26. Means 26 comprises a pair of horizontally disposed rolls 27 and 28. These rolls 27 and 28 terminate at their outer end in tapered reduced portions 29 and 31, respectively. The purpose of the tapered portions 29 and 31 is to act as guides for directing the cotton stalks 32, as shown in Figure 4, into contact with the cylindrical portion of the rolls 27 and 28. Novel means is also provided for supporting the rolls 27 and 28, which means comprises a U-shaped frame 33 mounted below the torque tube 14 by means of brackets 34 and 35. In order to support the torque tube in rigid fixed relation there is provided a plurality of brackets 36. The latter brackets are fixed to the tongue 19 as shown at 37 and to the torque tube in any suitable manner as shown at 38. It can, therefore, be seen that the torque tube will be maintained in rigid fixed relation at all times with the tongue 19.

The frame 33, carrying the rolls 27 and 28, is supported on its inner side by means of the brackets 34 and 35 and its outer side is provided with a wheel 41 adapted to move along the surface of the field or ground. This wheel 41 is fixed to the outer portion of the frame 33 by the means of a bracket 42, which is provided with a suitable hub and axle 43. The vertical portion of the bracket 42 is provided with a slot 44 (see Fig. 2), whereby the elevation of the frame from the ground may be adjusted. Any suitable means, such as the bolt 45, may be employed for fastening the bracket 42 in rigid fixed relation with the adjacent side of the frame 33. Similar slots 46 are provided in the brackets 34 and 35 for lowering and raising the inner side of the frame 33. Thus it can be seen that the rolls 27 and 28 may be adjusted as desired to travel along above the ground at the required distance.

The roll 27 is supported at its outer end by a fixed bearing 48, the latter being positioned in the adjacent portion of the frame 33. The rear end of the roll 27 terminates in a reduced portion 49, which portion is supported by a fixed bearing in the adjacent portion of the frame 33, as is clearly shown by the drawing. The roll 28 is supported within the frame 33 similar to the roll 27, with the exception that the front bearing 51 is movable within the adjacent portion of the frame 33. A spring 52 of the required strength is positioned to bias the bearing inwardly for the purpose of permitting the rolls to spread apart in case some uncrushable object is drawn between them. The rear end of roll 28 is also provided with a reduced portion 49, which portion is supported in a movable bearing within the adjacent portion of the frame 33 and likewise a spring 53 is positioned to bias the rolls 27 and 28 toward one another for the reason above stated.

Novel means is also provided for rotating rolls 27 and 28 in opposite directions, which means comprises a ratchet wheel 55 fixed to the propeller shaft 16. This is done by means of cutting away a portion of the torque tube 14. A similar ratchet wheel 56 of the required ratio is provided on the reduced portion 49 of the roll 27. These two ratchet wheels 55 and 56 are operably connected by means of a chain 57. Thus it can be seen that the propeller shaft 16 will turn through the mediums of the means 10 as the apparatus is drawn along the ground which will rotate the ratchet wheel 55, ratchet wheel 56 through the medium of a chain 57 and since the ratchet wheel 56 is fixed to the reduced portion 49 of the roll 27, the latter will be rotated in the direction indicated by the arrow 58 (see Fig. 4).

In order that the rolls 27 and 28 will positively rotate simultaneously and in opposite directions, there are provided gears 61 and 62 on the rolls 27 and 28 respectively and in mesh relation, so that as the roll 27 is rotated through the medium of the propeller shaft 16 in the direction as shown at 58 the roll 28 will rotate in the direction shown by the arrow 64 (see Fig. 4).

The operation of the apparatus is as follows: The apparatus is drawn along the field by a team of horses in such a position as to feed the cotton stalks 32 into the space 66 provided by the reduced portions 29 and 31 of the rolls 27 and 28 respectively. These rolls rotating within a predetermined distance of their adjacent surfaces will pick up cotton stalks and eject them from the ground. The ratio between the ratchet wheels 55 and 56 may be such as to give the desired speed to the rolls 27 and 28. The means for rotating the rolls is believed to be so clearly set forth above that there is no need to repeat their operation.

A convenient driver's seat 67 may be mounted on the tongue 19, as shown at 68, by means of a spring support 69.

Some of the important features of the invention are the simplicity of the operation, its rugged construction to withstand such use for which it is designed, its positiveness in operation, comparatively small price and the large saving in time and labor to the farmers in general.

While I have illustrated and described the present invention in connection with a horse-drawn apparatus, it will be obvious to those skilled in the art that the apparatus may readily be adapted to be driven by a motor or other propelling means and it will be understood that other changes, modifications, substitutions, additions and omissions may be made without departing from the spirit and scope of the appended claims.

I claim:

1. A farming apparatus comprising a propeller shaft, a pair of rolls, means for mounting said rolls in adjustable relation with said shaft, said means including a U-shaped frame, the last said means adapted to support one roll in rigid fixed relation with said frame and the other of said rolls in movable relation with both the said frame and the first said roll.

2. A farming apparatus comprising a power shaft, a pair of rolls disposed in horizontal relation, means for rotatably connecting said rolls with said shaft, means for supporting said rolls adjacent said shaft and another means for adjusting the relative position of said rolls with said shaft.

3. A claim in accordance with claim 2 wherein the said rolls terminate at one of their ends in a reduced tapered portion.

4. A farming apparatus including a supporting member, a U-shaped frame, a pair of rolls turnably mounted in said frame and means for adjusting the position of said frame relative to said supporting member.

FURMAN L. TUCKER.